United States Patent
Lorey (10) Patent No.: US 9,604,557 B2
(45) Date of Patent: Mar. 28, 2017

(54) DUST-INSENSITIVE SLIDE RAIL

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/685,907

(22) Filed: Apr. 14, 2015

(65) Prior Publication Data

US 2015/0298588 A1 Oct. 22, 2015

(30) Foreign Application Priority Data

Apr. 16, 2014 (DE) ........................ 10 2014 005 620

(51) Int. Cl.
*B60N 2/46* (2006.01)
(52) U.S. Cl.
CPC ................................. *B60N 2/4646* (2013.01)
(58) Field of Classification Search
CPC ...... B60N 2/46; B60N 2/4626; B60N 2/4646; A47C 1/03; A47C 7/54
USPC ...................................................... 297/411.2
See application file for complete search history.

(56) References Cited

U.S. PATENT DOCUMENTS

| | | | |
|---|---|---|---|
| 937,343 | A | 10/1909 | Wallace |
| 1,257,427 | A | 2/1918 | Underwood |
| 2,201,261 | A * | 5/1940 | Frey .......................... A47C 7/54 297/411.42 |
| 2,777,531 | A | 1/1957 | Erickson |
| 3,342,528 | A | 9/1967 | Radke et al. |
| 3,393,938 | A | 7/1968 | Meyer et al. |
| 3,888,329 | A | 6/1975 | Monaghan |
| 4,108,493 | A | 8/1978 | Naus |
| 4,195,882 | A | 4/1980 | Daswick |
| 4,244,623 | A | 1/1981 | Hall |
| 4,307,913 | A | 12/1981 | Spiegelhoff |
| 4,311,338 | A | 1/1982 | Moorhouse |
| 4,828,323 | A | 5/1989 | Brodersen et al. |

(Continued)

FOREIGN PATENT DOCUMENTS

| | | |
|---|---|---|
| AT | 321497 | 4/1975 |
| DE | 1796557 | 9/1959 |

(Continued)

OTHER PUBLICATIONS

Machine Translation of FR 2 914 714; Feb. 11, 2016; http://translationportal.epo.org/emtp/translate/?Action=description-retrieval&COUNTRY=FR&ENGINE=google&FORMAT=docdb&KIND=A1&LOCALE=en_EP&NUMBER=2914714&OPS=ops.epo.org/3.1&SRCLANG=fr&TRGLANG=en.*

(Continued)

*Primary Examiner* — Ryan Kwiecinski
(74) *Attorney, Agent, or Firm* — Sheridan Ross PC (57) ABSTRACT

A guide device is provided for guiding sliding movement of an armrest of a vehicle seat, the device comprising a guide rail, a sliding rail, and at least one slide, wherein the slide is arranged in an installed deformed state using a first spring element region formed on the slide and a second spring element region located a distance therefrom to contact an inner side of the sliding rail. A third spring element region is formed between the first and the second spring element regions interconnecting the first and second spring element regions. In the installed deformed state, the third region is formed in a curve at a distance from an inner side of the sliding rail and in the non-installed undeformed state, the third region is formed in a straight line.

13 Claims, 7 Drawing Sheets

(56) References Cited

U.S. PATENT DOCUMENTS

| | | |
|---|---|---|
| 5,108,150 A | 4/1992 | Stas |
| 5,292,097 A | 3/1994 | Russell |
| 5,439,267 A * | 8/1995 | Peterson .................. A47C 1/03 297/411.2 |
| 5,547,247 A | 8/1996 | Dixon |
| 5,743,595 A | 4/1998 | Kirdulis |
| 6,224,149 B1 | 5/2001 | Gevaert |
| 6,893,095 B2 | 5/2005 | Schambre et al. |
| 7,210,735 B2 | 5/2007 | Lang |
| 7,980,631 B2 | 7/2011 | Diffient |
| 8,132,861 B2 | 3/2012 | Cone |
| 8,534,733 B2 * | 9/2013 | Schreurs ..................... 296/1.09 |
| 8,950,816 B2 | 2/2015 | Ott et al. |
| 2001/0000639 A1 | 5/2001 | Park et al. |
| 2002/0096928 A1 | 7/2002 | Bidare |
| 2005/0194827 A1 | 9/2005 | Dowty et al. |
| 2009/0066103 A1 * | 3/2009 | Koarai ................. B60N 2/4606 296/24.34 |
| 2010/0194168 A1 | 8/2010 | Titz |
| 2011/0236130 A1 | 9/2011 | Klein et al. |
| 2011/0278898 A1 * | 11/2011 | Lai ........................... A47C 1/03 297/411.37 |
| 2013/0181500 A1 | 7/2013 | Buehlmeyer et al. |
| 2015/0001909 A1 | 1/2015 | Lorey |

FOREIGN PATENT DOCUMENTS

| | | | |
|---|---|---|---|
| DE | 7228055 | 11/1972 | |
| DE | 6939112 | 3/1974 | |
| DE | 2644485 | 4/1978 | |
| DE | 3046049 | 7/1982 | |
| DE | 4042105 | 10/1992 | |
| DE | 4126518 | 2/1993 | |
| DE | 4215628 | 11/1993 | |
| DE | 19937378 | 7/2000 | |
| DE | 19920220 | 11/2000 | |
| DE | 20307102 | 10/2003 | |
| DE | 60116924 | 11/2006 | |
| DE | 102006028453 | 12/2007 | |
| DE | 102007012133 | 9/2008 | |
| DE | 102010009526 | 8/2011 | |
| DE | 102010005703 A1 * | 9/2011 | ........... B60N 2/4646 |
| DE | 102005006977 | 2/2013 | |
| DE | 20 2013 103 009 U1 | 7/2013 | |
| DE | 202013103009 | 7/2013 | |
| DE | 102012108306 A1 * | 3/2014 | ........... B60N 2/4646 |
| EP | 1676744 | 7/2006 | |
| FR | 2748432 | 11/1997 | |
| FR | 2895336 | 6/2007 | |
| FR | 2914714 A1 * | 10/2008 | ........... B60N 2/4646 |
| FR | 2927855 | 8/2009 | |
| FR | 2929185 | 10/2009 | |
| FR | 2930208 | 10/2009 | |
| GB | 2170099 | 7/1986 | |
| GB | 2277869 | 11/1994 | |
| GB | 2453165 | 4/2009 | |
| JP | H01-131357 | 9/1989 | |
| JP | 2006 336 818 A | 12/2006 | |
| JP | 2006-336818 | 12/2006 | |
| JP | WO 2009017130 A1 * | 2/2009 | ........... B60N 2/4646 |
| WO | WO 03/068556 | 8/2003 | |
| WO | WO 2011/020919 | 2/2011 | |

OTHER PUBLICATIONS

Examination Report for German Patent Application No. 102011055895.0, dated Feb. 29, 2012, 3 pages.
Examination Report for German Patent Application No. 102011055895.0, dated Oct. 2, 2012, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
European Search Report (no English translation available) for European Patent Application No. 12194557.0, dated Feb. 7, 2013, 3 pages.
Official Action (no English translation available) for German Patent Application No. 12194557.0, dated Jan. 29, 2015, 5 pages.
Official Action for U.S. Appl. No. 13/691,055, mailed Sep. 19, 2014, 9 pages.
Final Action for U.S. Appl. No. 13/691,055, mailed Feb. 24, 2015, 9 pages.
Official Action for U.S. Appl. No. 13/691,055, mailed Jun. 3, 2015, 8 pages.
Notice of Allowance for U.S. Appl. No. 13/691,055, mailed Nov. 12, 2015, 9 pages.
Official Action for U.S. Appl. No. 14/314,582, mailed Nov. 13, 2015 6 pages.
European Search Report (no English translation available) for European Patent Application No. 13196759.8 dated Apr. 14, 2014, 6 pages.
Official Action (no English translation available) for German Patent Application No. 102013106708.5 dated Mar. 11, 2014, 2 pages.
Examination Report prepared by the German Patent Office on Feb. 11, 2015, for German Application No. 102014005620.1, 3 pages (no English translation available).
Official Action for U.S. Appl. No. 14/109,372, mailed Aug. 27, 2014 10 pages.
Notice of Allowance for U.S. Appl. No. 14/109,372, mailed Dec. 3, 2014 9 pages.
Official Action for U.S. Appl. No. 14/314,582, mailed May 22, 2015 6 pages Restriction Requirement.
Official Action for U.S. Appl. No. 14/314,582, mailed Jul. 30, 2015 12 pages.
Examination Report prepared by the German Patent Office on Feb. 11, 2015, for German Application No. 10 2014 005 620.1.

* cited by examiner

DUST-INSENSITIVE SLIDE RAIL

CROSS-REFERENCE TO RELATED APPLICATIONS

This application claims the benefit of German Application No. 10 2014 005 620.1 filed Apr. 16, 2014, the contents of which are incorporated herein by reference.

The invention relates to a guide device for guiding a sliding movement, in particular a sliding movement of an armrest of a vehicle seat, comprising a guide rail and a sliding rail arranged displaceably in a longitudinal adjustment direction relative thereto, wherein at least one slide can be arranged without play between the guide rail and the sliding rail.

Generic vehicle seats having such a guide device acting in and/or against the direction of the seat or direction of travel respectively for guiding a sliding movement for example of an arm rest are already known from the prior art. Said guide devices offer the user of the utility motor vehicle seat the option of adjusting the position of the armrest according to the user's height and arm length and his/her personal comfort requirements in that the armrest can be displaced forwards or backwards starting from an initial position into an adjusted position and locked such that an optimum position of the rest surface provided by the armrest is available to every user.

Associated locking devices for securing the respective position are already well known from the prior art and are not mentioned further in the present application.

A sliding rail guide, i.e. a linear sliding guide, is constructed such that the two rails, which move relative to one another, contact one another via sliding surfaces. A sliding rail is therefore more cost effective and can be constructed more compactly than a ball rail, i.e. a guide device having rails which are mounted on ball bearings relative to one another. However, it must be borne in mind when designing the rails that the static friction occurring between the two rails, i.e. the friction that occurs when the rails do not move relative to one another, must not be so great that the sliding of the rails relative to one another is prevented.

Generally, the static frictional force, i.e. the force which has to be overcome in order to move a component, which is in contact with another component, out of its rest position into movement, is greater than the sliding frictional force, which in turn must be overcome in order to maintain the movement of components which are already moving relative to one another. In contrast to rolling friction occurring in the case of a ball rail, the coefficient of friction in the case of the sliding friction is also greater, which can additionally inhibit the relative movement of the rails.

Furthermore, it has to be considered that during assembly of the two rails, play may occur as a result of the tolerances occurring such that the two rails cannot be guided cleanly against one another. In the other extreme case, a clamping effect can occur during assembly as a result of pretension.

Furthermore, a guide device mounted in such a way is very sensitive to foreign bodies which arrange themselves between the rails. In particular, dust may collect between the rails for example and after some time may inhibit the movement of the rails relative to one another. This dust sensitivity is even more extreme when the rails are provided with a lubricant, i.e. are greased for example. The dust can then combine with the lubricant, as a result of which it becomes hard. The increased friction inhibits the movement of the rails relative to one another; moreover, increased wear of the components is additionally to be expected.

It is therefore an object of the present invention to provide a guide device for guiding a sliding movement, which overcomes the disadvantages referred to above, without deviating from a cost effective and compact slide bearing arrangement. In particular, this slide bearing guide device should be non-dust-sensitive and the two rails should be arranged without play relative to one another.

This object is achieved according to the features recited in the claims.

The object is achieved by a guide device for guiding a sliding movement, in particular a sliding movement of an armrest of a vehicle seat, comprising a guide rail and a sliding rail which is arranged displaceably in a longitudinal adjustment direction relative thereto, at least one slide being able to be arranged without play between the guide rail and the sliding rail, the slide being able to be arranged in an installed, deformed state using at least one first spring element region which is formed on the slide and a second spring element region which is at a distance therefrom so as to contact an inner side of the sliding rail, the first and the second spring element region being able to be arranged in a strip-like manner in the installed, deformed state and perpendicularly to the longitudinal adjustment direction in relation to the longitudinal extension thereof, a third spring element region of the slide which is formed between the first and the second spring element region interconnecting the first and second spring element regions and in the installed, deformed state, being formed in the manner of a curve at a distance from the inner side of the sliding rail and in the non-installed, undeformed state, being formed in a straight line.

The spring element regions, in particular the at least one third spring element region, therefore undergo a deformation during installation between the sliding rail and the guide rail. In this respect, the undeformed state of the slide corresponds to the state when the slide is present without contact to other components, i.e. is not installed. The undeformed state of the slide simultaneously corresponds to the undeformed state of the spring element regions.

Analogously, the deformed state of the slide corresponds to the state when the slide is arranged without play between the rails and in particular the spring elements are pretensioned. For this purpose the slide is pushed for example onto the guide rail and thereby deformed. The deformed state of the slide simultaneously corresponds to the deformed state of the spring element regions.

In the deformed state, therefore, firstly the inner sides of the slide are arranged so as to be in contact with the outer sides of the guide rails and secondly the first and second spring element regions are arranged so as to be in contact with at least one inner side of the sliding rail. In this respect, in the deformed state, the third spring element region is formed at a distance from the sliding rail in a curved shape.

By forming a curved third spring element region at a distance in the deformed state, the first and second spring element regions form sharp corners relative to the sliding rail, which act in particular as dust strippers. This prevents the dust from settling between sliding surfaces and causing increased wear and friction. According to a preferred embodiment, no lubricant is arranged in particular between the sliding rail and the guide rail, in particular no fluid lubricant, as a result of which the unfavourable effect of dust or other foreign bodies is further decreased.

In addition, it can be observed that as a result of the installed slide, an arrangement without play of the two rails relative to one another can be achieved. On one side, the slide is in particular the link between the guide rail and the sliding rail, since it forms contact with both rails simultaneously, as will be described in detail below. In this respect, any play existing between the rails is reduced or eliminated respectively. In addition, the slide or slides ensure that the rails move relative to one another at a defined distance. Jamming of the two rails is therefore prevented.

According to a preferred embodiment, the slide is substantially in the form of a C profile, inner sides of the C profile being able to be arranged so as to be in contact with outer sides of the guide rail.

By means of the described geometry, the assembly can be carried out in a simple manner in the form of pushing the slide onto the guide rail. The guide rail preferably has a substantially hat-shaped cross section for this purpose. At least one slide in each case is pushed onto at least one of the two outer plates of the guide rail. The two outer plates of the guide rail are limited in each case by the outer sides of the guide rail.

In order to be able to form the contact region with the sliding rail, it is advantageous in this case for the outer contour of the slide, which is formed by three outer sides of the C profile, to have a greater dimension at least in portions relative to the inner contour of the sliding rail, which is formed by the inner sides of the sliding rail. "In portions" of course preferably relates to the portions that are formed by the spring element regions. This greater dimension advantageously has a value which is a range of from 0.1 to 1.00 mm, preferably 0.6 mm.

The C profile and/or the slide itself can have rounded corners in this respect. Furthermore, it is advantageous for design and production for the slide to be symmetrical relative to two planes, of which the first is spanned and defined respectively by the width extension and height extension of the slide and the second by the longitudinal extension and width extension of the slide.

In order to be able to form the described contact regions between slide and sliding rail, it is advantageous for the spring element regions to be arranged on outer sides of the C profile. The outer sides are preferably the upper, the vertical and the lower outer side of the C profile and together preferably form the shape of the letter C. In this case, the position data correspond to the position as can be found in the case of the guide device in use in a vehicle seat. At the same time, the three outer sides are, of course, arranged facing away from the guide rail.

If according to a preferred embodiment a first, a second and a third spring element region respectively is now arranged on each of the three outer sides, then in the case of the symmetrical configuration described above, the spring element regions, which are arranged on the upper outer side, have the same form as the spring element regions which are arranged on the lower outer side. Furthermore, the form of the spring element regions which are arranged on the vertical outer side is preferably different to the form of the spring element regions which are arranged on the upper and/or lower outer side.

The deformation of the spring elements on the slide can be facilitated in particular if at least one load relief region in the form of a cutaway is formed on the slide so as to be adjacent to the spring element regions.

As a result of the load relief region, which can also be in the form of a slide portion having a low thickness, it is ensured that the material of the spring element regions and/or adjacent material regions can simply take the place of the load relief regions during deformation, either in part or in full. The load relief region therefore has a lower volumetric extension in the deformed state of the slide than in the undeformed state thereof.

The load relief region, in particular the cutaway, therefore ensures that the third spring element region can deform towards a deformation direction. This deformation direction is arranged facing away from the inner side of the sliding rail in each case. Because the load relief region offers little to no resistance whatsoever to the deforming spring element region due to a lack of or reduced material, the spring element region can deform as described above.

In this case, the load relief region, in particular the cutaway, is preferably arranged in each case in the deformation direction of the spring element regions, in particular of the third spring element regions, so as to be adjacent to the spring element regions. Said region is preferably arranged on the upper and/or lower outer side of the C profile. Furthermore, said region is preferably arranged continuously from the upper and/or lower outer side of the C profile as far as the associated inner side of the C profile. With regard to the load relief region, in particular the cutaway, which belongs to the spring element regions which are arranged on the upper and/or lower outer side of the C profile, it applies that it is formed by the inner sides of the C profile, therefore in particular by the hollow space of the C profile.

The load relief region, in particular the cutaway or the profile respectively which is formed thereby, therefore likewise undergoes a deformation when the spring element regions are deformed. It may generally be observed that the profile that the region forms undergoes compression.

It is therefore advantageous according to further embodiments for the cutaway to be formed as a hollow space of the C profile and/or from a first substantially rectangular portion with rounded corners and a second arc-shaped portion.

In order to assist the deformation of the slide and of the spring element regions respectively, it is advantageous for the material used and the form of the spring element regions respectively to ensure that the spring element regions become more flexible with increasing load. It is therefore advantageous according to a further embodiment for the spring element regions to have a declining spring characteristic. The resilient spring elements are, however, also advantageous with regard to the tolerance issues described above, since a sliding guide without play with tolerance compensation up to approximately 1 mm in the height and width directions can be ensured in particular by the deformation thereof.

In order to ensure the form stability of the slide and to assist the deformation thereof, it is advantageous for a stop element to be arranged on each outer side of the C profile on both sides of the spring element regions.

These stop elements can, for example, be in the form of a thickening of the material. It is also conceivable for inserts from other, for example more rigid, materials to be arranged as stop elements. The stop elements can limit the spring deflection and reduce play between the two rails.

In order to achieve production of the slide that is as cost-effective as possible, said slide can be made for example by means of an injection moulding process and consist of just one part. Plastics material is very suitable for this process. Materials such as Teflon, which further improve the sliding properties, can be added to the plastics material.

It is therefore advantageous according to further preferred embodiments for the slide to be formed in one piece and/or to consist of plastics material, preferably of plastics material containing Teflon. In this respect, all of the elements of the slide, therefore for example the spring elements, the stop elements and the rest of the C-shaped slide are mechanically rigidly interconnected and formed in one piece. As a result of this, in particular the spring characteristics and/or the whole slide respectively can be pre-calculated and dimensioned very well.

In practice it has proven to be advantageous for the slide to have a length from a range of from 20 to 28 mm, preferably 24 mm, and/or a width from a range of from 6 to 12 mm, preferably 8.85 mm and/or a height from a range of from 6 to 10 mm, preferably 8 mm. These dimensions are very suitable for conventional guide and sliding rails in particular for armrests.

The sliding properties of the guide device can additionally be optimised if at least part of the inner side of the sliding rail is coated with anti-friction coating, preferably with anti-friction coating containing Teflon. As a result of this coating, the coefficient of friction between the sliding rail and the slide decreases further. If the slide also consists of plastics material containing Teflon according to the above preferred embodiment, there is in particular the advantage with the resulting material pairing of Teflon to Teflon that the static friction and the sliding friction are almost identical and the coefficient of friction is extremely low at a value of approximately 0.04.

Further advantages, aims and properties of the present invention are described with reference to the accompanying drawings and the following description, in which a guide device according to the invention is shown and described by way of example and in which.

Figure 1:
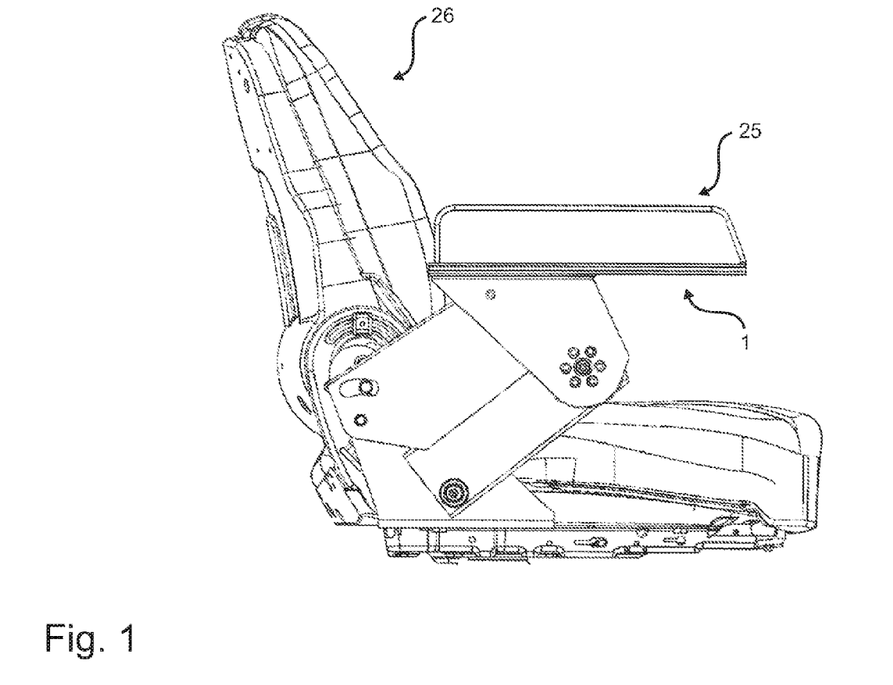
FIG. 1 is a schematic side view of a guide device according to the invention arranged in a vehicle seat on the armrest with a guide rail and a sliding rail arranged displaceably relative thereto.
Figure 2:
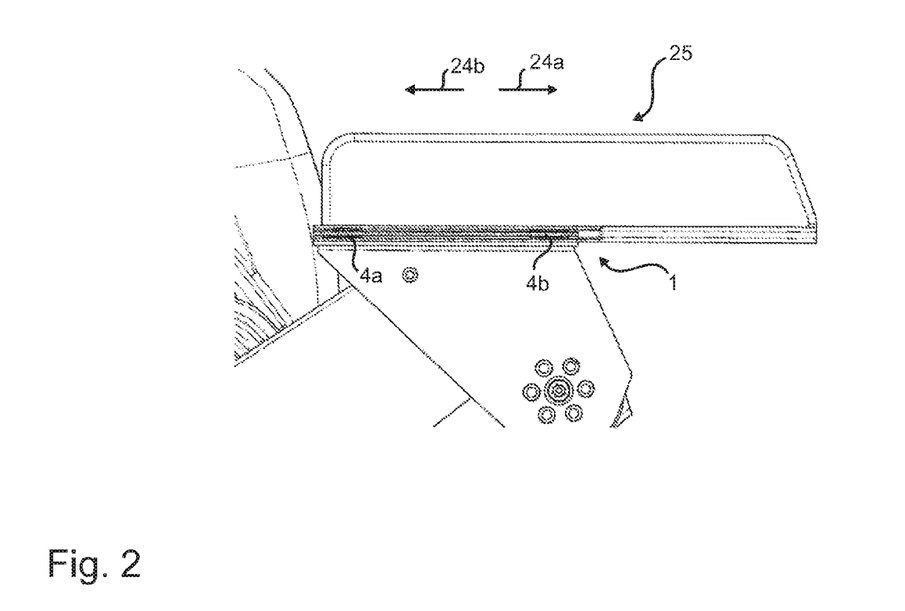
FIG. 2 is a schematic sectional view of the guide device arranged on the armrest according to the invention from FIG. 1.

The vehicle seat 26 shown in FIG. 1 has two armrests 25 in this example with a guide device 1 according to the invention. Only one armrest 25 is shown in this view. By means of the guide device 1, which consists of a guide rail 2 and a sliding rail 3, the armrest 25 can be moved forwards 24a and backwards 24b (see FIG. 2) in longitudinal displacement directions, the directions being defined from the view of an occupant of the seat. Moreover, the slides 4a, 4b are arranged between the rails 2, 3.

Figure 3:
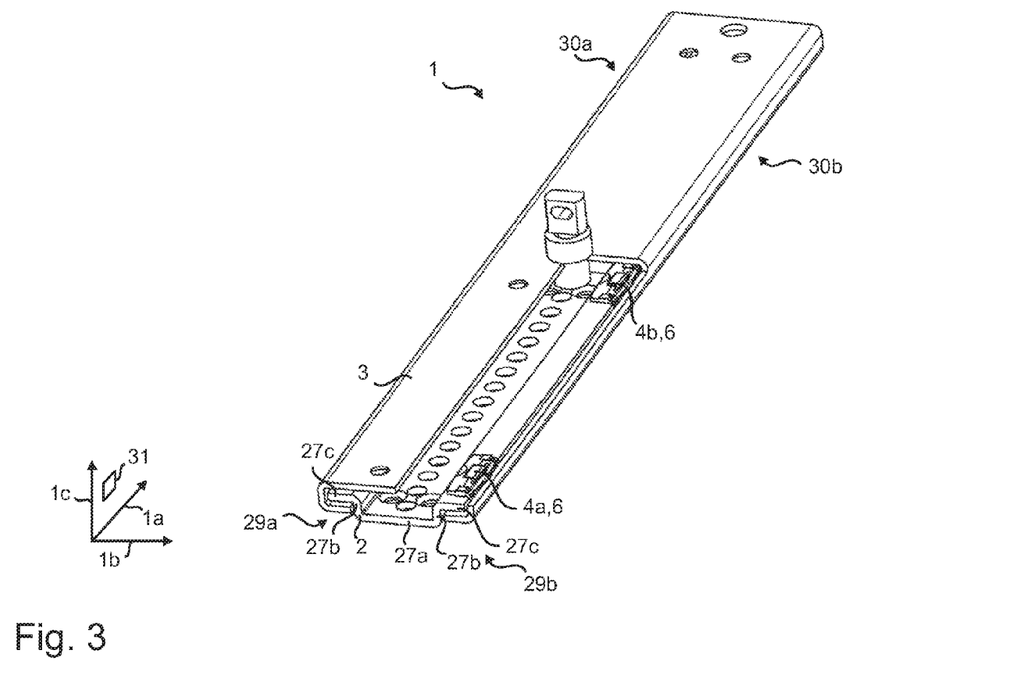
FIG. 3 is a schematic perspective sectional view of the guide device according to the invention from FIG. 1.

FIG. 3 now shows the guide device 1 according to the invention with longitudinal extension 1a, width extension 1b and height extension 1c, parts of the sliding rail 3 having been removed for the purpose of clarity. In this example, two slides 4a, 4b can be seen, which are arranged between the rails 2, 3 without play.

The whole guide device 1 has a symmetrical arrangement with respect to a plane 31, which is spanned by the longitudinal extension 1a and height extension 1c of the guide device 1, such that two sides 29a, 29b of the guide device 1 are formed. In this respect it should be noted that in particular the profiles of the components of the guide device 1 extend symmetrically to this plane 31 on both sides 29a, 29b. In this case, the guide rail 2 has a substantially hat-shaped profile, which is formed by a horizontal base plate 27a, two vertical connecting plates 27b and two outer plates 27c. The sliding rail 3 has a substantially C-shaped profile consisting of a horizontal base plate 28a, two vertical central plates 28b and two horizontal connecting plates 28c.

It is of course conceivable for further slides 4a, 4b to be arranged along the longitudinal extension 1a and/or on both sides 29a, 29b. It is therefore particularly advantageous in the case of the arrangement shown for two slides 4a, 4b in each case to be arranged on both sides 29a, 29b, therefore four slides 4a, 4b altogether.

Figure 4:
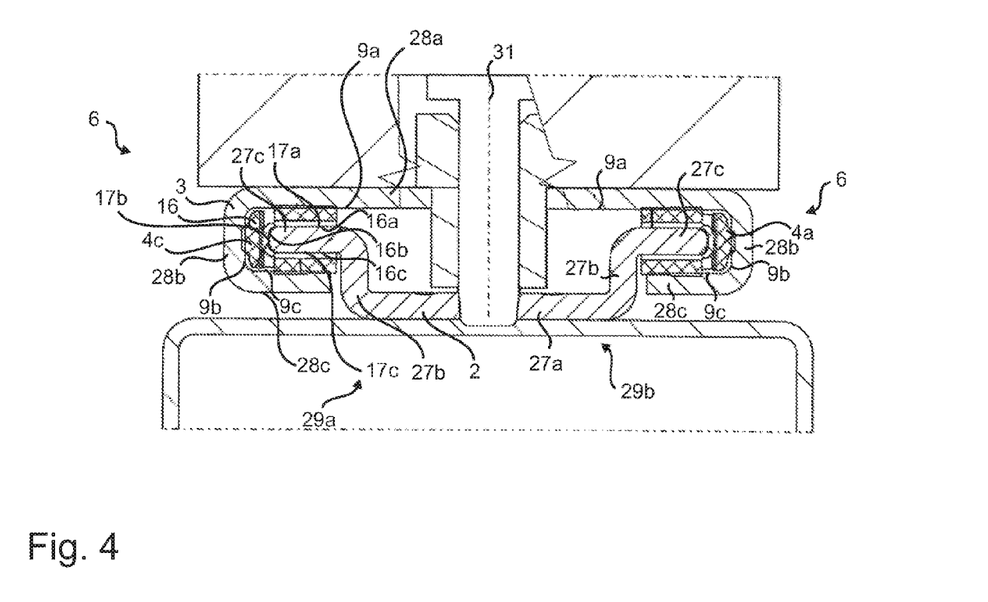
FIG. 4 is a schematic cross-sectional view of the guide device from FIG. 1.

FIG. 4 is a cross-sectional view of the guide device 1 with the symmetry plane 31 drawn in. Because of the symmetrical properties, only one side 29a of the guide device 1 is described hereinafter. This description also applies analogously to the other side 29b.

In addition to the sliding rail 3 and the guide rail 2 and other components needed for assembly respectively, a slide 4c, which is substantially in the form of a C profile 15, can be seen arranged between the two rails 2, 3, inner sides 16a, 16b, 16c of the C profile 15 being arranged so as to contact outer sides 17a, 17b, 17c of the guide rail 2. In this FIG. 4, the slide 4c and the outer sides 5a, 5b, 5c of the slide are shown in a simplified manner with a greater dimension in portions relative to the inner sides 9a, 9b, 9c of the sliding rail 3, i.e. in the undeformed state 11. In fact, the slide 4c is of course in the deformed state 6 such that the contour overlaps between outer sides 5a, 5b, 5c of the slide 4c and inner sides 9a, 9b, 9c of the sliding rail 3 that can be seen in particular in this figure do not exist.

At least one slide 4c respectively is pushed onto the two outer plates 27c of the guide rail 2. In this case, the two outer plates 27c of the guide rail 2 are each limited by the outer sides 17a, 17b, 17c of the guide rail 2. The inner sides 9a, 9b, 9c of the sliding rail 3 in turn form all or part of the inner limit of the plates 28a, 28b, 28c of the sliding rail 3.

Figure 5:
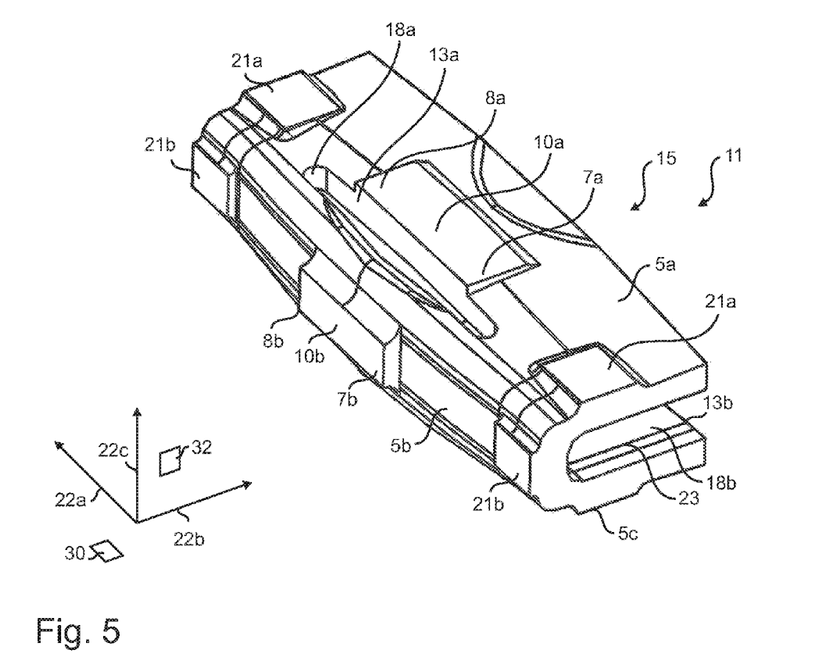
FIG. 5 is a schematic perspective view of the slide.

FIG. 5 is a perspective view of a one-piece slide 4a in the undeformed state 11 with longitudinal extension 22a, width extension 22b and height extension 22c.

It can be seen that the slide 4a or the profile of the slide 4a respectively is symmetrical to the plane 30, which is spanned by the longitudinal extension 22a and width extension 22b and simultaneously to the plane 32, which is spanned by the height extension 22c and width extension 22b. In this respect the description of the upper side 5a applies analogously to the lower side 5c of the slide.

On the upper side 5a of the slide 4a, spring element regions 7a, 8a, 10a can be seen, which are arranged so as to be adjacent to a load relief region 13a which is formed here by a cutaway 18a. In this respect, the first 7a and the second 8a spring element region are arranged at a distance from one another. They are interconnected by the third spring element region 10a. In this example, which shows the undeformed state 11 of the slide 4a, the third spring element region 10a extends in a straight line.

Analogously, on the vertical side 5b of the slide 4a, spring element regions 7b, 8b, 10b can be seen, which are arranged so as to be adjacent to a load relief region 13b which is formed here by a cutaway 18b. The cutaway 18b is formed here advantageously as a hollow space 23 of the C profile 15. The first 7b and the second 8b spring element region are in this respect arranged at a distance from one another. They are interconnected by the third spring element region 10b. In this example, which shows the undeformed state 11 of the slide 4a, the third spring element region 10b extends in a straight line.

The spring element regions 7a, 7b, 8a, 8b, 10a, 10b are therefore arranged on outer sides 5a, 5b, 5c of the C profile 15 which is formed by the slide 4a.

Furthermore, it can be seen that one stop element 21a, 21b is arranged on each of the outer sides 5a, 5b, 5c of the C profile 15 on both sides of the spring element regions 7a, 7b, 8a, 8b, 10a, 10b.

Figure 6A:
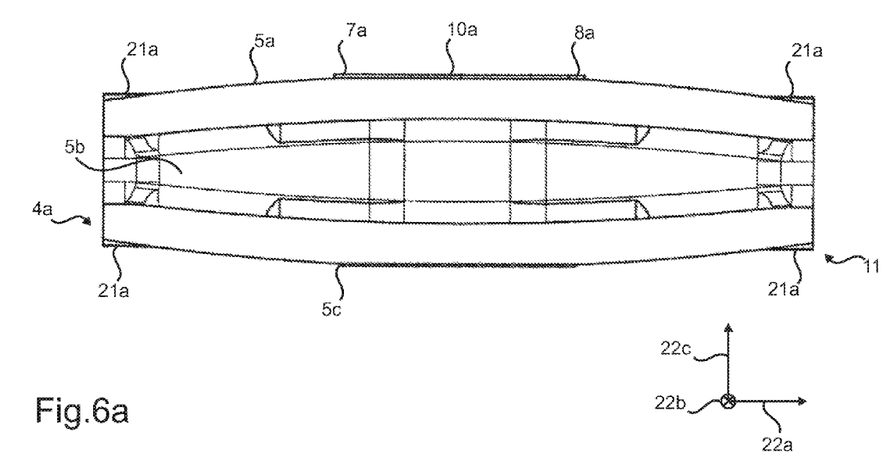
FIG. 6a is a schematic side view of a slide in the undeformed state.

FIG. 6a is a side view of a slide 4a in the undeformed state 11. The spring element regions 7a, 8a, 10a arranged on both sides 5a, 5c can be seen, the first 7a and the second 8a spring element region being interconnected in a straight line in the shown undeformed state of the third spring element region 10a. In particular, all three spring element regions 7a, 8a, 10a together therefore take the form of a straight line in the undeformed state 11 in this side view, and overall the form of a plane respectively.

Figure 6B:
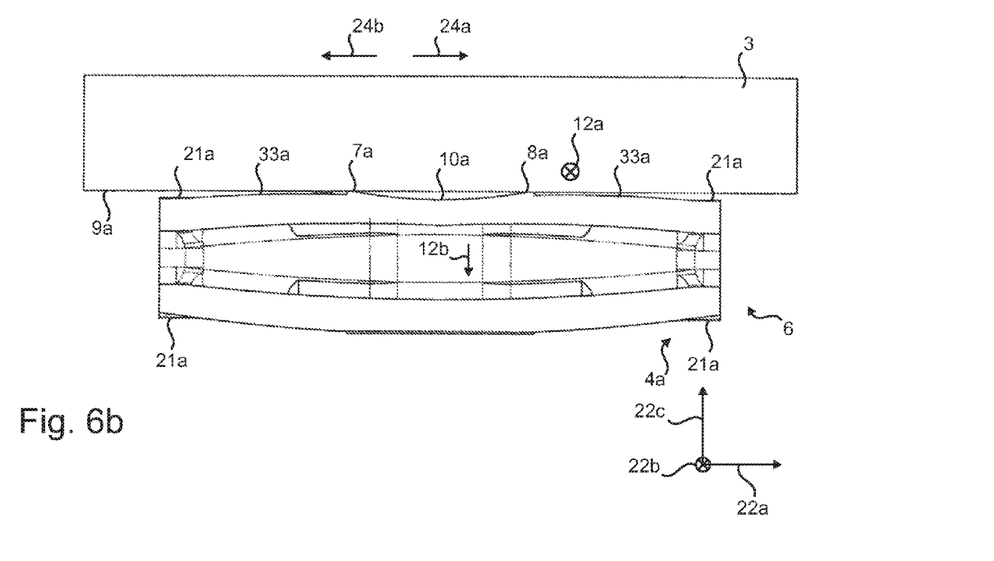
FIG. 6b is a schematic side view of a slide in the deformed state with a sliding rail.

FIG. 6b shows the slide from FIG. 6a in the deformed state 6 in contact with the inner side 9a of a sliding rail 3. For the purpose of simplification, the inner sides 9b and 9c of the sliding rail 3 are not shown. It can clearly be seen that the slide 4a in the installed, deformed state 6 is arranged so as to be in contact with the inner side 9a of the sliding rail 3 by means of at least one first spring element region 7a which is formed on the slide 4a and the second spring element region 8a which is at a distance therefrom. Moreover, it can be seen that the first 7a and the second 8a spring element region in the installed, deformed state 6 can be arranged in the form of a strip and in relation to the longitudinal extension 12a thereof, which extends in parallel with the width extension 22b of the slide 4a, perpendicularly to the longitudinal adjustment direction 24a, 24b. In order to form the strip shape, the spring element regions 7a, 8a have a small extension in the longitudinal direction 22a and a comparatively great extension in the width direction 22c (perpendicularly to the plane of the drawing).

Moreover, the third spring element region 10a of the slide 4a is formed in a curved shape at a distance from the inner side 9a of the sliding rail 3 in the installed, deformed state 6.

With regard to the load relief region 13b, in particular the cutaway 18b, which belongs to the spring element regions 7a, 8a, 10a which are arranged on the upper 5a and/or lower outer side 5c of the C profile 15, it applies that said region is formed by the inner sides 16a, 16b, 16c of the C profile 15, therefore in particular by the hollow space 23 of the C profile 15.

Stop elements 21a are formed on both sides of the spring element regions 7a, 8a, 10a. These are smaller than the spring element regions 7a, 8a, 10a in relation to the extension thereof towards the height extension 22c of the slide 4a; they are therefore in particular not formed so as to contact the inner side 9a of the sliding rail 3.

Between the spring element regions 7a, 8a, 10a and the stop elements 21a, transition regions 33a are formed. These are likewise smaller than the spring element regions 7a, 8a, 10a in relation to the extension thereof towards the height extension 22c of the slide 4a; they are therefore in particular not formed so as to contact the inner side 9a of the sliding rail 3. However, the transition regions 33a are arranged closer to the inner side 9a of the sliding rail 3 than the stop elements 21a. Between the substantially curved transition regions 33a and the spring element regions 7a and 8a, the profile of the slide 4a forms the shape of a right angle in this view.

Figure 7A:
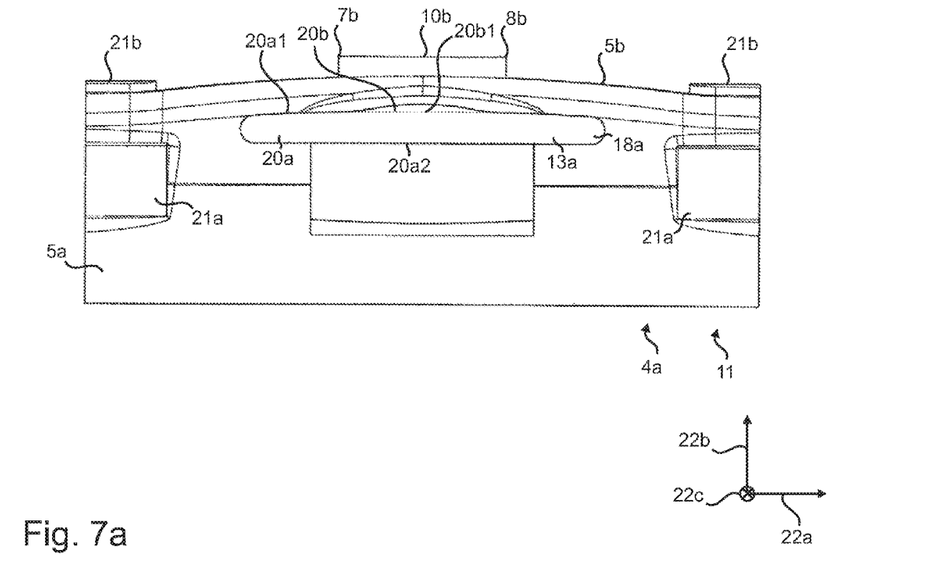
FIG. 7a is a schematic plan view of the slide in the undeformed state.

FIG. 7a is a plan view of the slide 4a from FIG. 6a in the undeformed state 11. The spring element regions 7b, 8b, 10b which are arranged on the vertical side 5b can be seen, the third spring element region 10b interconnecting the first 7b and the second 8b spring element region in a straight line in the shown undeformed state. In particular, all three spring element regions 7b, 8b, 10b together therefore take the form of a straight line in the undeformed state 11 in this side view and overall the form of a plane respectively.

At the same time, it can be seen that a load relief region 13a in the form of a cutaway 18a is arranged so as to be adjacent to the spring element regions 7b, 8b, 10b. Said region can conceivably be divided into a first portion 20a and a second portion 20b, the first portion 20a being substantially rectangular with rounded corners and the second portion 20b being arc-shaped. In this case, a longitudinal side 20a1 of the first portion is connected to the second portion 20b, the connecting line 20b1 corresponding to the secant by which the arc shape of the second portion 20b is defined. The first longitudinal side 20a1 of the first portion 20a does not have to extend in a straight line in this case but can for example be bent, sloping and/or curved. The second longitudinal side 20a2 of the first portion 20 in contrast is preferably formed in a straight line.

Figure 7B:
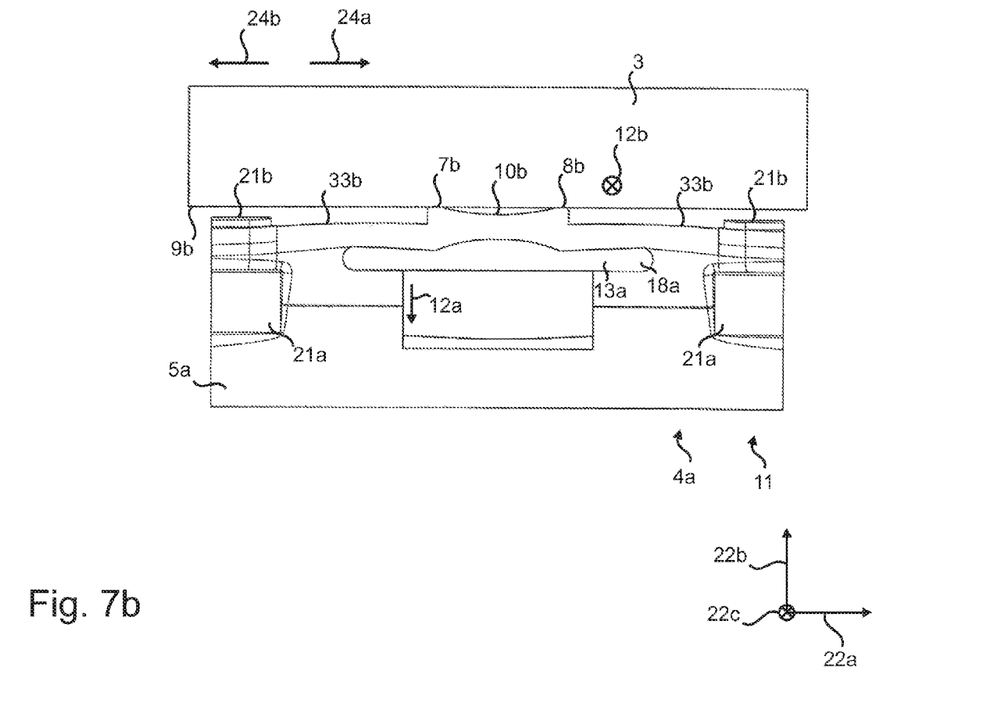
FIG. 7b is a schematic plan view of the slide in the deformed state with a sliding rail.

FIG. 7b shows the slide from FIG. 7a in the deformed state 6 in contact with the inner side 9b of a sliding rail 3. For the purpose of simplification, the inner sides 9a and 9c of the sliding rail 3 are not shown. It can clearly be seen that the slide 4a in the installed, deformed state 6 is arranged so as to be in contact with the inner side 9b of the sliding rail 3 by means of the first spring element region 7b which is formed on the slide 4a and the second spring element region 8b which is arranged at a distance therefrom. Moreover, it can be seen that the first 7b and the second 8b spring element region in the installed, deformed state 6 can be arranged in the form of a strip and in relation to the longitudinal extension 12b thereof, which extends in parallel with the height extension 22c of the slide 4a, perpendicularly to the longitudinal adjustment direction 24a, 24b. In order to form the strip shape, the spring element regions 7b, 8b have a small extension in the longitudinal direction 22a and a comparatively great extension in the height direction 22c (perpendicularly to the plane of the drawing).

Moreover, the third spring element region 10b of the slide 4a is formed in a curved shape at a distance from the inner side 9b of the sliding rail 3 in the installed, deformed state 6.

The load relief region 13a, in particular the cutaway 18a ensures in this case that the material of the spring element regions 7b, 8b, 10b and/or adjacent material regions can simply take the place, in part or in full, of the load relief region 13a in the deformed state 6. The load relief region 13a therefore has a lower volumetric extension in the deformed state 6 of the slide 4a than in the undeformed state 11 thereof.

The load relief region 13a, in particular the cutaway 18a, therefore ensures that the third spring element region 10b can deform towards a deformation direction. This deformation direction in each case is arranged facing away from the inner side 9b of the sliding rail 3. In this example, the deformation direction corresponds to the longitudinal extension 12a of the spring element regions 7a, 8a which are arranged on both sides 5a, 5c of the slide 4a. Because the load relief region 13a offers little to no resistance whatsoever to the deforming spring element region 10b due to a lack of or reduced material, the spring element region 10b can deform as described above.

In this case, the load relief region 13a, in particular the cutaway 18a, is preferably arranged so as to be adjacent to the spring element regions 7b, 8b, 10b in each case in the deformation direction 12a in particular of the third spring element region 10b. In this respect, it is preferably arranged on the upper 5a and/or lower outer side 5c of the C profile 15. In a particularly preferred manner it is arranged continuously from the upper 5a and/or lower outer side 5c of the C profile 15 as far as the associated inner side 16a and/or inner side 16c of the C profile.

The load relief regions 13a, 13b, in particular the cutaways 18a, 18b and the profiles respectively formed thereby, therefore undergo a deformation during the deformation of the spring element regions 7a, 8a, 10a; 7b, 8b, 10b. Generally it can be observed that the profiles undergo compression.

Stop elements 21b are formed on both sides of the spring element regions 7b, 8b, 10b. These are smaller than the spring element regions 7b, 8b, 10b in relation to the extension thereof towards the width extension 22b of the slide 4a; they are therefore in particular not formed so as to contact the inner side 9b of the sliding rail 3.

Between the spring element regions 7b, 8b, 10b and the stop elements 21b, transition regions 33b are formed. These are likewise smaller than the spring element regions 7b, 8b, 10b in relation to the extension thereof towards the width extension 22b of the slide 4a; they are therefore in particular not formed so as to contact the inner side 9b of the sliding rail 3. However, the transition regions 33b are arranged closer to the inner side 9b of the sliding rail 3 than the stop elements 21b. Between the substantially curved transition regions 33b and the spring element regions 7b and 8b respectively, the profile of the slide 4a forms the shape of a right angle in this view.

FIGS. 8a to 8d once again are various views of the slide 4a with the dimensions thereof length 19a, width 19b and height 19c.

Figure 8A:
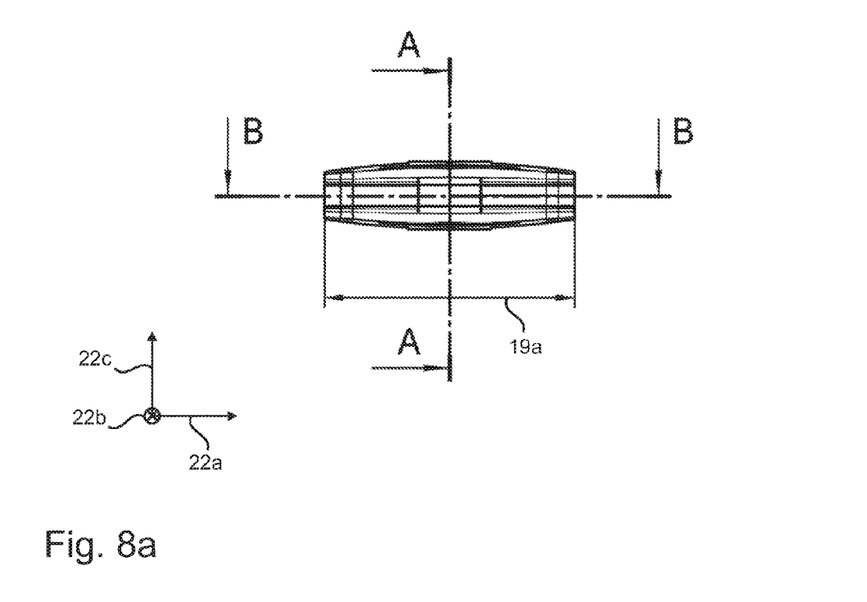
FIG. 8a-d are a schematic side view, cross-sectional view and perspective view of the slide.

FIG. 8a is a side view of the slide 4a.

Figure 8B:
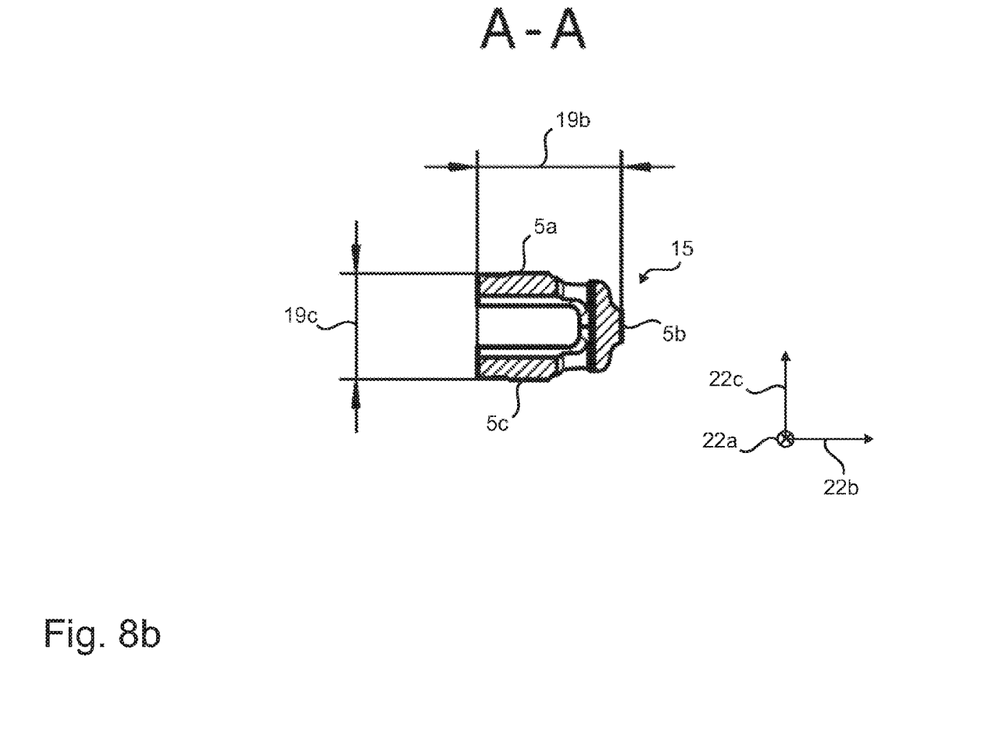

FIG. 8b is a cross-sectional view of the slide 4a along the line A-A from FIG. 8a. It becomes clear that the C profile 15 has a combination of rounded and straight portions along the outer sides 5a, 5b, 5c thereof.

Figure 8C:
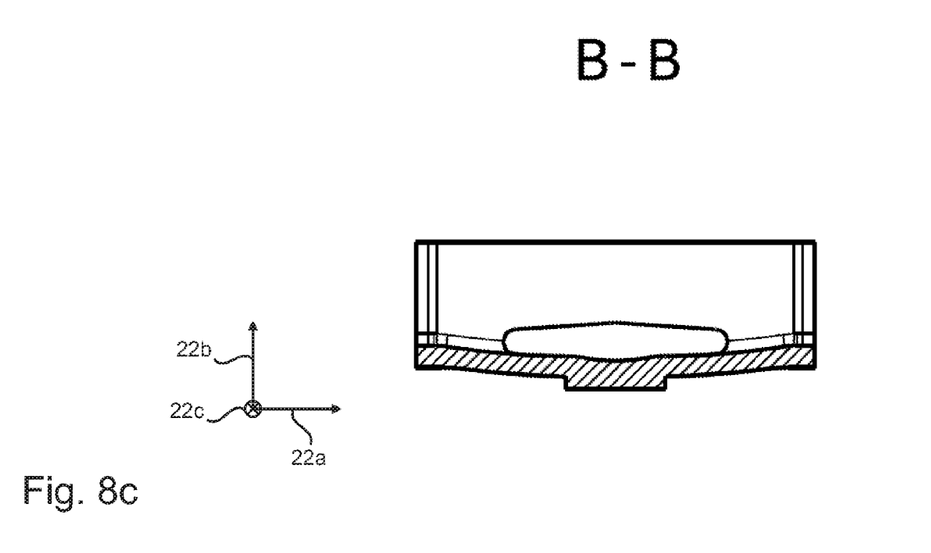

FIG. 8c is a cross sectional view of the slide 4a along the line B-B from FIG. 8a.

Figure 8D:
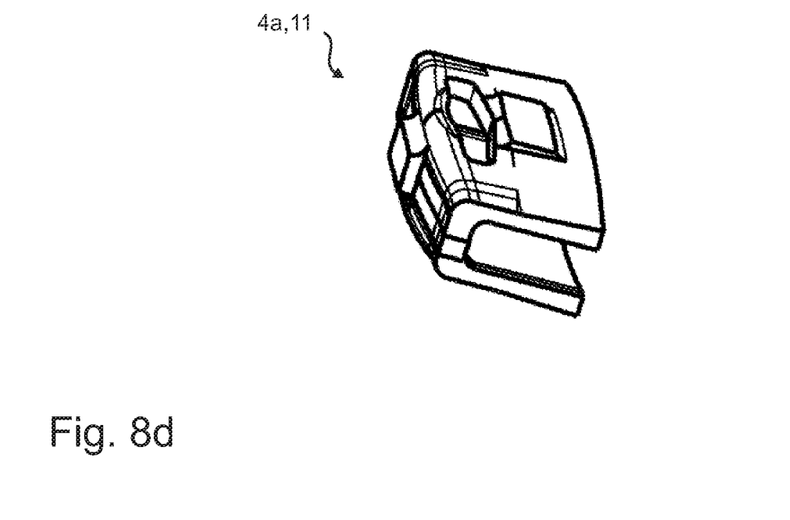

FIG. 8d is a perspective view of the slide 4a.

Figure 9:
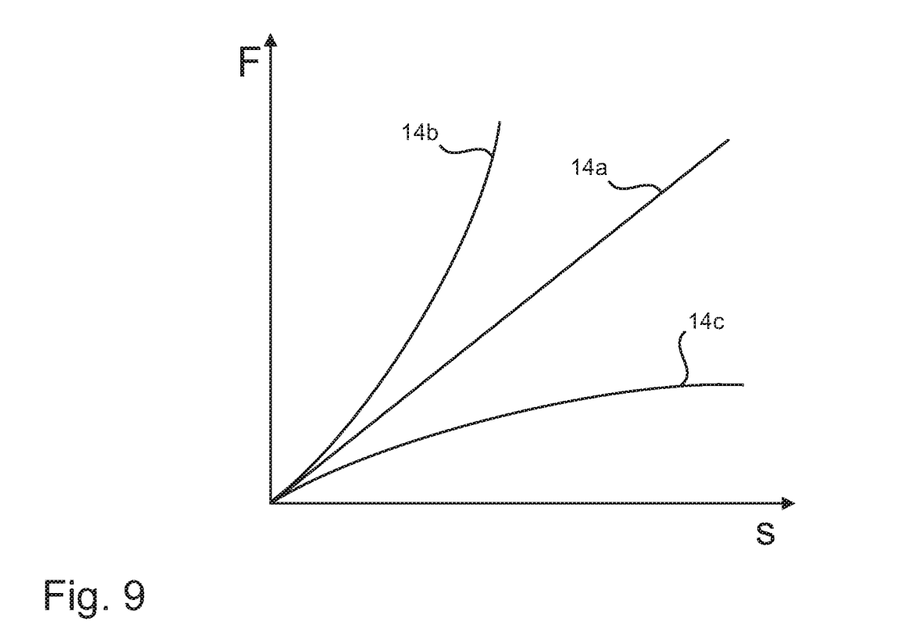
FIG. 9 shows spring characteristics.

FIG. 9 is a comparison of spring characteristics 14a, 14b, 14c which describe the dependency of the spring force F on the spring deflections. The spring characteristic 14a describes a linear connection between spring force F and spring deflection s, therefore the behavior of a spring with constant spring stiffness, the spring stiffness constituting the derivation of the function F(s), therefore dF/ds. If the spring stiffness increases, however, with increasing spring force F, there is a progressive spring characteristic 14b. If the spring becomes more flexible with increasing spring force F, said spring is a preferred spring according to the invention, with a declining spring characteristic 14c.

It shall be understood that the embodiment described above is only a first configuration of the guide device according to the invention. In this respect, the configuration of the invention is not limited to this embodiment.

All features disclosed in the application documents are claimed as being essential to the invention provided that they are novel either in isolation or in combination over the prior art.

LIST OF REFERENCE NUMERALS

1 Guide device
2 Guide rail
3 Sliding rail
4a, 4b, 4c Slide
5a, 5b, 5c Outer sides
6 Installed, deformed state
7a, 7b First spring element region
8a, 8b Second spring element region
9a, 9b, 9c Inner side of the sliding rail
10a, 10b Third spring element region
11 Non-installed, undeformed state
12a, 12b Longitudinal extension
13a, 13b Load relief region
14a, b, c Spring characteristics
15 C profile
16 Central branch
16a, b, c Inner sides
17a, b, c Outer sides
18a, 18b Cutaway
19a Length
19b Width
19c Height
20a First portion
20a1 Longitudinal side
20a2 Longitudinal side
20b Second portion
20b1 Connecting line
21a, 21b Stop elements
22a Longitudinal extension
22b Width extension
22c Height extension
23 Hollow space
24a Longitudinal adjustment direction
24b Longitudinal adjustment direction
25 Armrest
26 Vehicle seat
27a, b, c Plates
28a, b, c Plates
29a, b Sides
30 Plane
31 Plane
32 Plane
33a, b Transition region

What is claimed is:

1. A guide device for guiding a sliding movement of an armrest of a vehicle seat comprising:
a guide rail and a sliding rail arranged displaceably in a longitudinal adjustment direction relative thereto, at least one slide being able to be arranged without play between the guide rail and the sliding rail, wherein the at least one slide can be arranged in the installed, deformed state by means of at least one first spring element region which is arranged on the at least one slide and a second spring element region which is arranged at a distance therefrom so as to contact an inner side of the sliding rail, the first and the second spring element region being able to be arranged in a strip-like manner in the installed, deformed state and perpendicularly to the longitudinal adjustment direction in relation to the longitudinal extension thereof, a third spring element region of the at least one slide which is formed between the first and the second spring element region interconnecting the first and second spring element region and in the installed, deformed state, being formed in the manner of a curve at a distance from the inner side of the sliding rail, wherein the at least one slide is in the form of a C profile and one stop element is arranged on each outer side of the C profile on both sides of the first, second, and third spring element regions.

2. The guide device according to claim 1, wherein inner sides of the C profile being able to be arranged so as to contact outer sides of the guide rail.

3. The guide device according to claim 2, wherein the first, second, and third spring element regions are arranged on outer sides of the C profile.

4. The guide device according to claim 1, wherein at least one load relief region in the form of a cutaway is formed on the at least one slide so as to be adjacent to the first, second, and third spring element regions.

5. The guide device according to claim 4, wherein the cutaway is formed as a hollow space of the C profile.

6. The guide device according to claim 4, wherein the cutaway is formed from a first rectangular portion with rounded corners and a second arc-shaped portion.

7. The guide device according to claim 1, wherein the first, second, and third spring element regions have a declining spring characteristic.

8. The guide device according to claim 1, wherein the at least one slide is formed in one piece.

9. The guide device according to claim 1, wherein the at least one slide has a length from a range of from 20 to 28 mm.

10. The guide device according to claim 1, wherein at least part of the inner side of the sliding rail is coated with an anti-friction coating.

11. The guide device according to claim 1, wherein the at least one slide consists of plastics material.

12. The guide device according to claim 1, wherein the at least one slide has a width from a range of from 6 to 12 mm.

13. The guide device according to claim 1, wherein the at least one slide has a height from a range of from 6 to 10 mm.

* * * * *